April 7, 1931. B. H. URSCHEL 1,799,200
UNIVERSAL JOINT
Filed June 7, 1929
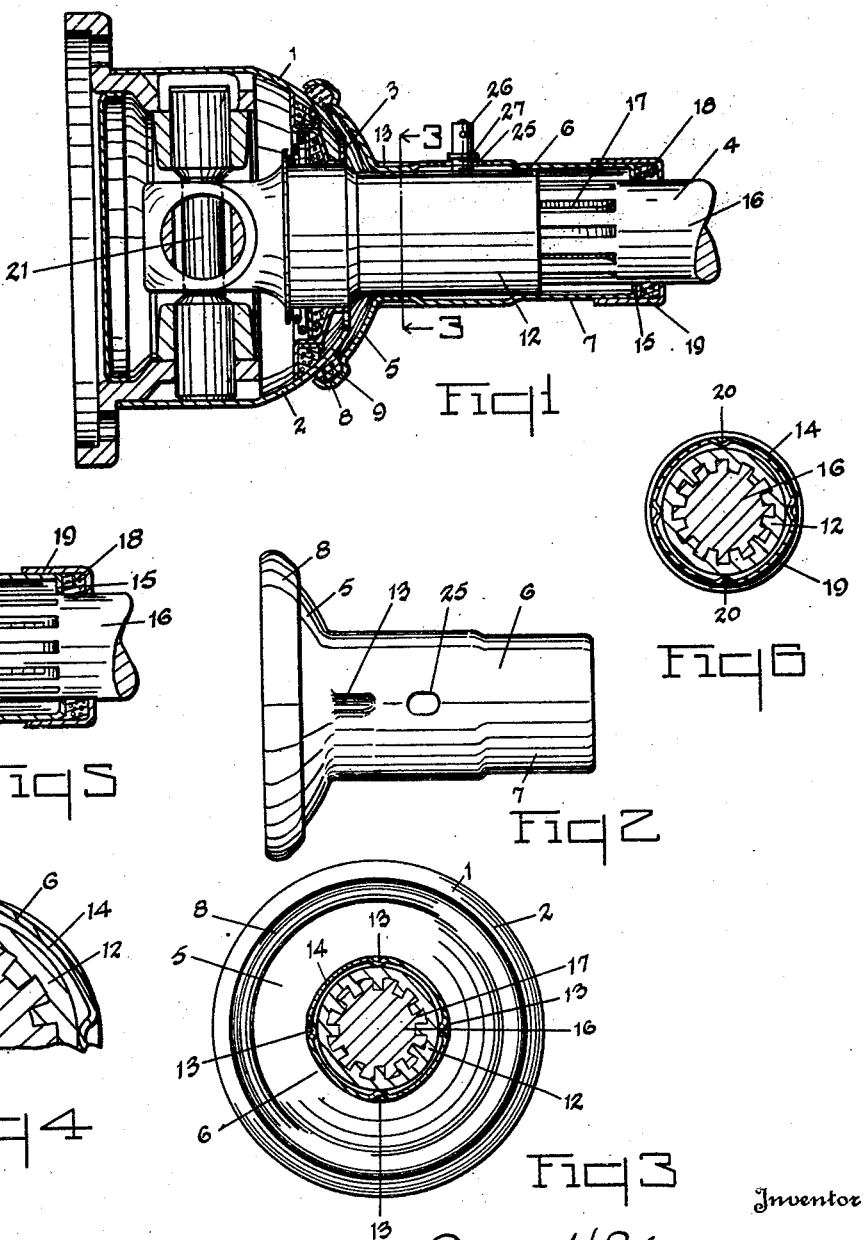

Patented Apr. 7, 1931

1,799,200

UNITED STATES PATENT OFFICE

BERTIS H. URSCHEL, OF BOWLING GREEN, OHIO, ASSIGNOR TO URSCHEL ENGINEERING COMPANY, OF TOLEDO, OHIO, A CORPORATION OF OHIO

UNIVERSAL JOINT

Application filed June 7, 1929. Serial No. 369,050.

My invention has particularly for its object to provide an improved splash guard for universal joints of motor-driven vehicles. The universal joints are located in the drive shaft and connect a telescoping part of the shaft with the engine driven shaft. The guard has a sleeve that covers the relatively slidable parts of the drive shaft, and a flaring part that covers the opening in the boot through which the shaft extends. The guard may be formed of thin metal and formed to fit the drive shaft. Preferably, it has a plurality of indented portions that are elastically pressed against the exterior surface of the female member of the telescoping part, a portion that fits the outer end of the said member, and an inwardly extending flange portion that fits the male member of the telescoping shaft. The indentations slightly distort the cylindricity of the portions of the sleeve located between the indentations and afford a yielding movement of the flaring part or plate of the guard with the boot which may be caused by a very slight eccentricity as between the centers of the universal joint and of the boot due to variations in machining. Thus, if desired, a gasket may be located intermediate the periphery of the flaring part and the boot and the elasticity of the sleeve and the plate will maintain a sealing pressure between the gasket and the boot. The invention thus provides an improvement in universal joint constructions which enables the use of a relatively thin metal splash guard and which may be secured in position by forcing it over the relatively long female member of the telescoping drive shaft without buckling of the sheet material of which the guard is formed.

The invention may be contained in universal joint splash guards that vary in their details of construction and, to illustrate a practical application of the invention, I have selected a guard and a modification thereof that contain the invention as an example of such structures and shall describe it hereinafter. The splash guard selected for purposes of illustration is shown in the accompanying drawings.

Fig. 1 is a view of a longitudinal section of the splash guard and of parts of the universal joint. Fig. 2 is a top view of the splash guard. Fig. 3 is a view of a section taken on the plane of the line 3—3 indicated in Fig. 1. Fig. 4 is an enlarged view of a part of the section shown in Fig. 3. Fig. 5 is a view of a longitudinal section of a modification of the sleeve part of the guard. Fig. 6 is a view of a section taken on the plane of the line 6—6 indicated in Fig. 5.

The splash guard may be used in connection with universal joints of different forms. Such joints are provided with a lubricant containing boot 1 and are usually provided with a substantially spherical end portion 2, having an opening 3 through which the telescoping drive shaft, such as the shaft 4, extends. A splash plate is located over a part of the spherical portion 2 of the boot to prevent mud and dirt from entering the boot. The plate is usually clamped to the parts of the telescoping drive shaft 4 by various methods to secure the guard plate more or less accurately in position with reference to the boot.

In the form of construction shown in the drawing, the mud guard 6 operates to protect not only the boot, but also the relatively sliding surfaces of the drive shaft. The splash guard 6 is formed by die pressing it from sheet metal to form the guard plate 5 and the sleeve 7. If desired, the guard plate 5 may be provided with a channelled edge portion 8, in which a gasket 9 may be located and held pressed againt the spherical surface 2 of the boot by the plate 5. The sheet metal, from which the splash guard 6 is formed, being of relatively thin metal and the female member 12 of the telescoping driving shaft being relatively long, the sleeve 7 is so formed that the major portion of the part of the sleeve that surrounds the female member 12 of the telescoping shaft 4 is considerably larger in diameter than the exterior diameter of the female member, and the inner end of the sleeve 7 is provided with indented portions 13 that normally are located within the circle of the exterior surface of the female member 12 and so that, when the splash guard 6 is forced onto the female member 12, the indented portions 13 will elastically clamp the surface of the female member 12 at spaced points on the surface of the female member. When the indentations 13 are formed, it produces a slight distortion from the normal cylindrical part of the sleeves in those portions 14 located intermediate the indentations 13, which, however, give flexibility to the sleeve at the end having the plate 5, which enables the plate 5 to move with the boot 1 if there is any eccentricity as between the universal joint 21 and the boot 1. Consequently, if a gasket 9 is used in conjunction with the plate 5, the gasket will be maintained in yielding and elastic contact with the boot 1.

The outer end of the sleeve 7 is formed to have an inside diameter that is slightly less than that of the outside diameter of the female member and the length of the sleeve 7 is such that a portion of the outer end of the sleeve will enclose the portion of the outer end of the female member 12 so as to tightly fit the outer end of the female member 12, substantially as shown in Fig. 1. Thus, when the sleeve 7 is forced upon the female member 12, the inner end of the sleeve 7 will be held by the elastically pressed indented portions 13 and the outer end of the sleeve will fit the end of the female member 12 for a short distance from the outer end of the female member 12.

The outer end of the sleeve 7 is also provided with an inturned flange 15 that fits the male member 16 of the telescoping shaft 4 and at a point on the outside of the key-ways 17 of the male member 16. A gasket 18 may be placed against the inturned flange 15 and a cap or ferrule 19, having an opening of substantially the same diameter as that of the diameter of the male member 16 of the telescoping shaft, may be located on the end of the sleeve 7. The cap 19 fits over the end of the sleeve 7 and, when forced upon the sleeve 7, will clamp the gasket 18 in position and thus prevent dust and dirt from entering the interior of the sleeve. The splash guard not only operates to prevent mud and dust from entering the boot, but also from entering the sliding surfaces of the key-ways of the telescoping shaft.

If desired, the sleeve 6 may be provided with indentations 20, as indicated in Figs. 5 and 6, in place of providing the reduced portion 7 as in the form of construction illustrated in Figs. 1 and 2. The indentations 20 will also form the slightly distorted portions 14 in the same manner that the slightly distorted portions 14 are formed between the indentations 13. The indentations are so located as to engage the outer end of the sleeve 12. They cooperate to secure the plate 5 in position and enable the plates to float with the boot 1 due to any eccentricity that might exist as between the centers of the universal joint 19 and of the boot 1 as described above.

If desired, the sleeve may be provided with an opening 25 for receiving an alemite fitting 26. The alemite fitting 26 is usually provided with a flange 27 and, when the alemite fitting is screwed into the female member 12 of the telescoping shaft, the flange 27 will be elastically engaged by the exterior surface of the portion of the sleeve 7 that has an interior diameter materially larger than the exterior diameter of the female member of the telescoping shaft. If desired, the opening 25 may be made oblong to provide adjustment of the guard plate 5 with reference to the boot, the flange 27, however, being sufficiently large to cover the opening 25 notwithstanding such adjustment.

I claim:

1. In a splash guard for universal joints having telescoping shafts, a sheet metal member having a splash plate and a sleeve, a portion of the sleeve having an interior diameter greater than that of the female member of the telescoping shaft and indented parts for engaging the surface of the female member at spaced points, the sleeve having a part fitting the outer end of the female member whereby the splash plate may be readily secured in position on the female member of the telescoping shaft.

2. In a splash guard for universal joints having telescoping shafts, a sheet metal member having a guard plate and a sleeve, the sleeve having indented portions located near one end of the female member of the telescoping shaft for engaging the female member at spaced points and a portion fitting the surface of the female member at the outer end of the female member and an inturned flange located exterior to the key-ways of the male member of the telescoping shaft.

3. In a splash guard for universal joints, a sheet metal member having a splash plate and a sleeve, a portion of the sleeve having an interior diameter greater than that of the female member of the telescoping shaft and indented parts for engaging the surface of the female member at spaced points to yieldingly hold the splash plate in a definite relation to the boot notwithstanding any eccentricity as between the centers of the boot and the universal joint.

In witness whereof I have hereunto signed my name to this specification.

BERTIS H. URSCHEL.